(12) United States Patent
Grattan et al.

(10) Patent No.: US 7,418,171 B2
(45) Date of Patent: Aug. 26, 2008

(54) FIBRE BRAGG GRATING SENSORS

(75) Inventors: Kenneth Thomas Victor Grattan, Uxbridge (GB); Tong Sun, Kingsbury (GB); Weizhong Zhao, London (GB)

(73) Assignee: Kidde IP Holdings Limited (GB)

( * ) Notice: Subject to any disclaimer, the term of this patent is extended or adjusted under 35 U.S.C. 154(b) by 0 days.

(21) Appl. No.: 10/966,317

(22) Filed: Oct. 15, 2004

(65) Prior Publication Data

US 2005/0111793 A1    May 26, 2005

(30) Foreign Application Priority Data

Oct. 16, 2003    (GB) .................................. 0324272.4

(51) Int. Cl.
*G02B 6/34* (2006.01)
(52) U.S. Cl. ...................................................... 385/37
(58) Field of Classification Search .................... None
See application file for complete search history.

(56) References Cited

U.S. PATENT DOCUMENTS

| | | | |
|---|---|---|---|
| 4,761,073 A | | 8/1988 | Meltz et al. |
| 4,806,012 A | * | 2/1989 | Meltz et al. .................... 356/32 |
| 5,401,956 A | | 3/1995 | Dunphy et al. |
| 5,513,913 A | * | 5/1996 | Ball et al. .................... 374/120 |
| 5,945,666 A | | 8/1999 | Kersey et al. |
| 5,966,481 A | * | 10/1999 | Jolley et al. .................... 385/28 |
| 6,674,928 B2 | * | 1/2004 | Johnson et al. ................ 385/12 |
| 2003/0223687 A1 | * | 12/2003 | Blomquist et al. ............ 385/37 |
| 2004/0086245 A1 | * | 5/2004 | Farroni et al. ................ 385/123 |

FOREIGN PATENT DOCUMENTS

| | | |
|---|---|---|
| EP | 0 438 747 A3 | 7/1991 |
| GB | 2 268 581 A | 1/1994 |
| GB | 2 337 593 A | 11/1999 |

* cited by examiner

*Primary Examiner*—Sung Pak
*Assistant Examiner*—Hoang Tran
(74) *Attorney, Agent, or Firm*—Merchant & Gould P.C.

(57) ABSTRACT

A method and device for sensing spatial variations and/or temperature variations in the locality of a fiber optic cable 1 is disclosed, wherein a broadband light source 47 is used to shine incident light onto a series of fiber Bragg gratings contained within zones A, B and C. Each zone contains a plurality of fiber Bragg gratings, the plurality of fiber Bragg gratings in any one zone having a substantially identical grating period, and the fiber Bragg gratings in the respective zones having different grating periods. The reflected light from each fiber Bragg grating is returned back down the fiber optic cable 1 and redirected via a 2×1 coupler 51 to a wavelength detection system 53 and a personal computer 63. The combination of wavelength detection system 53 and personal computer 63 allow analysis of the reflected light patterns, as well as providing a user interface which enables detection of the occurrence of a spatial and/or a temperature variation. The location of the said variation along the fiber optic cable 1 is advantageously detectable in terms of the particular zone A, B or C in which the said variation has been sensed.

40 Claims, 3 Drawing Sheets

FIBRE BRAGG GRATING SENSORS

BACKGROUND OF THE INVENTION

This invention relates to a fibre optic cable, to a method of sensing spatial variations and/or temperature variations in a structure using a fibre optic cable, and to a device for sensing spatial variations and/or temperature variations in a structure, comprising a fibre optic cable.

The use of fibre Bragg gratings in sensors is well known. U.S. Pat. No. 4,761,073 (incorporated herein by reference) describes a spatially resolving fibre optic cable strain gauge which utilises fibre Bragg gratings, and it is also known to use similar fibre Bragg grating sensors to monitor variations in temperature. Variations are able to be sensed as the period and the effective refractive index of a fibre Bragg grating are altered as a result of a change in strain or a change in the ambient temperature in the locality of the fibre Bragg grating. However, fibre Bragg grating sensors forming the prior art suffer from a lack of spatial accuracy, and as a result the ability to precisely locate the source of strain and/or heat is compromised.

Fibre Bragg gratings are formed in photosensitive fibre optic cables by creating a periodic variation in the refractive index of the core of the fibre optic cable, which acts as a grating to reflect incident light. The wavelength of this reflected light, known as the Bragg wavelength $\lambda_B$, is dependent on the grating period and the effective refractive index of the fibre Bragg grating, according to the equation $$\lambda_B = 2n_{eff}\Lambda,$$

where $n_{eff}$ is the effective refractive index of the fibre optic cable and $\Lambda$ is the period of the fibre Bragg grating.

This Bragg wavelength is known to be affected as a consequence of localised spatial and/or temperature variations in the vicinity of the fibre Bragg grating. Fibre Bragg gratings have predictable, well defined responses to spatial and/or temperature variations. These responses are known to be approximately linear at and above room temperature, and fibre Bragg grating sensors operate by measuring the wavelength shift of the Bragg wavelength in response to the aforementioned spatial and/or temperature variations.

The Bragg wavelength shift $\Delta\lambda_B$ in response to spatial and/or temperature variations in the fibre optic cable in the vicinity of the fibre Bragg grating is brought about by a change in the grating period, and is found by differentiating the above equation to account for changes in the length of the fibre optic cable and/or the temperature in the vicinity of the fibre Bragg grating. This results in $$\Delta\lambda_B = 2\left(\Lambda\frac{\partial n_{eff}}{\partial l} + n_{eff}\frac{\partial \Lambda}{\partial l}\right) + 2\left(\Lambda\frac{\partial n_{eff}}{\partial T} + n_{eff}\frac{\partial \Lambda}{\partial T}\right).$$

There are currently two approaches to making sensors using fibre Bragg grating technology. The simplest approach is to write a plurality of identical fibre Bragg gratings (i.e. gratings with the same grating pitch) along the length of a fibre optic cable. Incident light is reflected by each of these fibre Bragg gratings, the Bragg wavelength of each reflection being the same due to the equality of the fibre Bragg gratings. Spatial and/or temperature variations in the locality of the fibre optic cable would result in a shift of the Bragg wavelength of the light reflected by one or more affected fibre Bragg gratings. This change can be sensed, and hence it is possible to detect that a spatial and/or temperature variation has occurred.

The approximate position of the spatial and/or temperature variations can be obtained by optical time domain reflectometry. In this technique, a very short pulse of light (of the order of 1 ns) is injected into the fibre optic cable and the reflected spectrum measured as a function of time after the pulse injection. This approach is limited in that, although spatial and/or temperature variations in the locality of the fibre optic cable are detectable, there is no provision for the precise location of such variations, given that the resolution of the position information is practically only of the order of a few meters, meaning that only fibre Bragg gratings that are several meters apart can be distinguished.

An alternative approach is to write a plurality of fibre Bragg gratings along the length of a fibre optic cable, each fibre Bragg grating having a unique grating pitch. Incident light is reflected by each of these fibre Bragg gratings, the Bragg wavelength of each reflection in this case being characteristic of a particular fibre Bragg grating. Spatial and/or temperature variations occurring in a particular vicinity will affect one or more of the fibre Bragg gratings in that vicinity, leading to a shift of the Bragg wavelength of the light reflected by the affected fibre Bragg grating or gratings. Analysis of the reflected light patterns therefore enables detection of the occurrence of a spatial and/or a temperature variation. The location of the variation along the fibre optic cable is also detectable by determining from which particular fibre Bragg grating or fibre Bragg gratings the shifted Bragg wavelength emanates. However, the Bragg wavelengths of the fibre Bragg gratings must in this case be sufficiently far apart so that the shift in the Bragg wavelength over the operating range of any grating does not overlap the different Bragg wavelength associated with another fibre Bragg grating. This provides a major restriction on the number of fibre Bragg gratings that can be interrogated with one sensor, introducing a degree of insensitivity to the system as the total number of Bragg wavelengths able to be sensed is severely limited to around 10 with the broadband light sources and spectrometers currently available. This means that a sensor with a fibre optic cable 10 m long will only have one fibre Bragg grating per meter. This creates large gaps where there is no sensitivity as local heating between two fibre Bragg gratings would not be detected. This is unsuitable for applications where a localised "hot-spot", only a few centimeters long, must be able to be detected anywhere along a sensor which may be many meters long.

The insensitivity described above is caused by a practical limit on the length a single fibre Bragg grating can have. Also, larger fibre Bragg gratings typically have a lower reflectivity per unit length, meaning that the reflection returned is an average of the total length of the fibre Bragg grating. In this case, the reflection from a localised "hot-spot" on the fibre Bragg grating would be relatively weak and difficult to detect.

The present invention offers an improvement to the approaches described above.

SUMMARY OF THE INVENTION

According to the first aspect of the invention, there is provided fibre optic cable having a plurality of zones wherein each zone contains a plurality of fibre Bragg gratings, the plurality of fibre Bragg gratings in any one zone having a substantially identical grating period, and the fibre Bragg gratings in the respective zones having different grating periods.

According to the second aspect of the invention, there is provided method of sensing spatial variations and/or temperature variations in a structure, including providing a fibre optic cable comprising a plurality of zones wherein each zone contains a plurality of fibre Bragg gratings, the plurality of fibre Bragg gratings in any one zone having a substantially identical grating period, and the fibre Bragg gratings in the respective zones having different grating periods; and locating the fibre optic cable with respect to the structure such that the fibre optic cable is subject to the variations and/or temperature variations in the structure.

According to a further aspect of the invention, there is provided a device for sensing spatial variations and/or temperature variations in a structure, including a fibre optic cable comprising a plurality of zones wherein each zone contains a plurality of fibre Bragg gratings, the plurality of fibre Bragg gratings in any one zone having a substantially identical grating period, and the fibre Bragg gratings in the respective zones having different grating periods.

In the embodiment to be described, within each zone the fibre Bragg gratings are substantially identical in that the grating period (and hence the reflected Bragg wavelength) of each fibre Bragg grating is the same, allowing the spacing between adjacent fibre Bragg gratings within each zone to be reduced. Incident light is reflected by each of these fibre Bragg gratings, with the Bragg wavelength of reflected light being identical for all fibre Bragg gratings contained within one particular zone (assuming no strain or temperature variation is present). This Bragg wavelength is therefore indicative of a particular zone. Spatial and/or temperature variations occurring in the vicinity of a zone will affect one or more of the fibre Bragg gratings contained in that zone, leading to a shift of the Bragg wavelength associated with that zone. Analysis of the reflected light patterns therefore enables detection of the occurrence of a spatial and/or a temperature variation, with the location of the said variation along the fibre optic cable also detectable in terms of the particular zone in which the said variation has been sensed. Although the wavelengths of the fibre Bragg gratings in different zones must be sufficiently far apart so that the shift in the Bragg wavelength of a fibre Bragg grating in one zone does not overlap the Bragg wavelength associated with another zone, as in the prior art described above, this embodiment offers greatly improved sensitivity to the detection of spatial and/or temperature variations occurring in the locality of the fibre optic cable. Within a particular zone, the fibre Bragg gratings can be closely spaced to provide good short length sensitivity.

Although the grating period of each fibre Bragg grating within a particular zone is substantially identical, fibre Bragg gratings within each zone may differ in terms of their length, spacing and/or reflectivity. This advantageously allows fibre Bragg gratings to be adjacent in a region within the zone where a high degree of spatial resolution is essential, whereas other regions within the said zone, in which the spatial resolution is less critical, could have more widely spaced fibre Bragg gratings.

There may also be provided a reference fibre Bragg grating, which is maintained at a known temperature. This reference fibre Bragg grating is monitored to allow correction for drifting in the sensory equipment. It is possible to include more than one reference fibre Bragg grating covering a range of wavelengths to maintain the precision of measurement across the full wavelength range.

BRIEF DESCRIPTION OF THE DRAWINGS

For a better understanding of the present invention, a fibre optic cable, a method of sensing spatial variations and/or temperature variations in a structure and a device for sensing spatial variations and/or temperature variations in a structure according to the present invention and embodying the present invention will now be described by way of example, with reference to the accompanying drawings in which.

In the drawings, like elements are generally designated with the same reference numeral.

DETAILED DESCRIPTION OF THE EMBODIMENTS OF THE INVENTION

Figure 1:
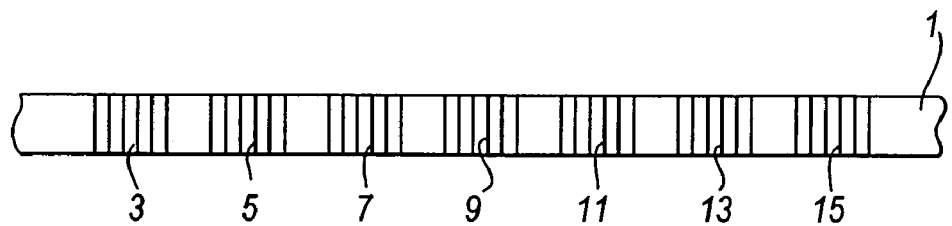
FIG. 1 shows one approach to creating a fibre Bragg grating sensor, according to the prior art.

FIG. 1 shows a prior art arrangement of a fibre optic cable 1 with a plurality of substantially identical fibre Bragg gratings 3 to 15 formed thereon, each fibre Bragg grating possessing the same grating pitch/period. A fibre Bragg grating sensor could be created utilising such a fibre optic cable 1. In such a sensor, the Bragg wavelength of the reflected light from each fibre Bragg grating 3 to 15 would be the same due to the identical grating period of each fibre Bragg grating. If a spatial and/or temperature variation was to occur in the vicinity of, for example, fibre Bragg grating 11, the Bragg wavelength of the reflected light from fibre Bragg grating 11 would be shifted because the distance between adjacent elements of the grating 11 is altered. This wavelength shift could be detected, and so the spatial and/or temperature variation can be sensed. The problem with this prior art arrangement is that the Bragg wavelength of the reflected light from each fibre Bragg grating is the same, and so there is no provision for assigning the shift in the Bragg wavelength to the particular fibre Bragg grating 11 responsible for the shift, and so precise location of the spatial and/or temperature cannot be determined or can only be obtained very approximately—for example by optical time domain reflectometry.

Figure 2:
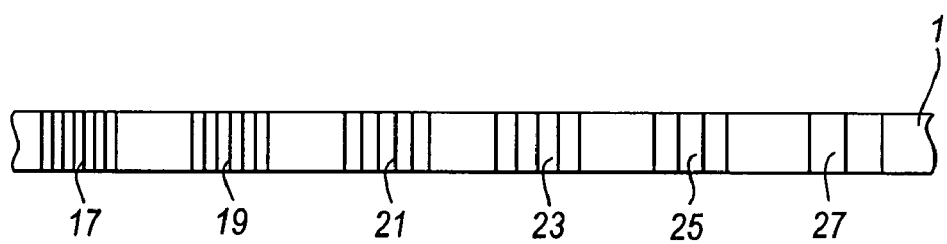
FIG. 2 shows an alternative approach to creating a fibre Bragg grating sensor, according to the prior art.

FIG. 2 shows a prior art arrangement of a fibre optic cable 1 with a plurality of fibre Bragg gratings 17 to 27 formed thereon, different to the arrangement of FIG. 1 in that each fibre Bragg grating has a unique grating period. A fibre Bragg grating sensor could be created utilising such a fibre optic cable 1. In such a sensor, the Bragg wavelength of the reflected light from each fibre Bragg grating 17 to 27 would be different due to the unique grating period of each fibre Bragg grating. If a spatial and/or temperature variation was to occur in the vicinity of, for example, fibre Bragg grating 23, the Bragg wavelength of the reflected light from fibre Bragg grating 23 would be shifted. This wavelength shift could be detected, and so the spatial and/or temperature variation has been sensed. As the Bragg wavelength corresponding to each fibre Bragg grating is unique (different), in this arrangement it is possible to associate the Bragg wavelength to the particular fibre Bragg grating 23, and hence the spatial and/or temperature variation can be located to the vicinity of fibre Bragg grating 23. This arrangement therefore potentially offers more precise and straightforward location of the spatial and/or temperature variation. However, only a limited number of different Bragg wavelengths can be sensed (typically 10). If a sensor is to monitor a large structure (for example, 10 meters in length), the fibre Bragg gratings in such an arrangement must be spaced by a substantial distance (by 1 meter in the example given). This introduces a degree of insensitivity to the system, as a spatial and/or temperature variation occurring in the gap between two adjacent fibre Bragg gratings may not sufficiently affect either fibre Bragg grating to create the Bragg wavelength shift required for detection.

Figure 3:
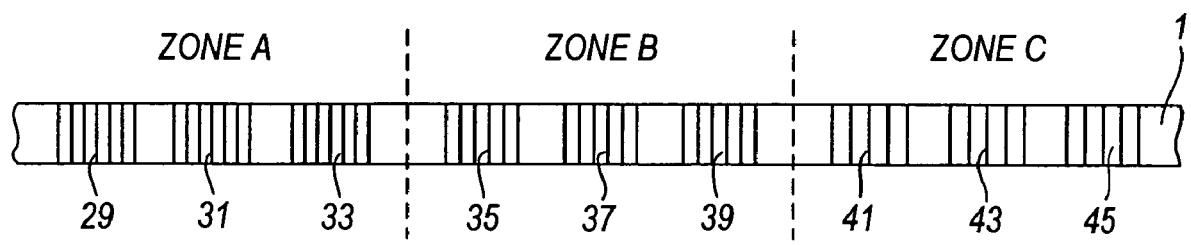
FIG. 3 shows a different approach to creating a fibre Bragg grating sensor according to the present invention.

FIG. 3 shows the arrangement of fibre Bragg gratings 29 to 45 formed on a fibre optic cable 1 in accordance with the present invention. The fibre optic cable 1 comprises a plurality of zones A, B and C. Zone A contains fibre Bragg gratings 29, 31 and 33 with identical grating periods (grating pitches), zone B contains fibre Bragg gratings 35, 37 and 39 with identical grating periods (grating pitches), and zone C contains fibre Bragg gratings 41, 43 and 45 with identical grating periods (grating pitches), although this arrangement is for descriptive purposes only and is not intended to limit the invention.

In particular, fibre Bragg gratings within each zone (29, 31 and 33 in zone A; 35, 37 and 39 in zone B; 41, 43 and 45 in zone C) may differ in terms of their length, spacing and/or reflectivity, thereby allowing fibre Bragg gratings to be adjacent in a region within the zone where a high degree of spatial resolution is essential, whereas other regions within the said zone, in which the spatial resolution is less critical, could have more widely spaced fibre Bragg gratings.

For example, a high degree of spatial resolution may be required in a particular region in the vicinity of fibre Bragg gratings 35 and 37 within zone B. Accordingly, fibre Bragg gratings 35 and 37 may be arranged to be adjacent by particular selection of the length and spacing of the fibre Bragg gratings 35 and 37. The close spacing of other fibre Bragg gratings within zone B is less critical in this case.

However, the gratings of the respective zones have different grating pitches. This means that the Bragg wavelength reflected by the gratings of each zone will be different.

Preferably, the pitches of the gratings of the respective zones are chosen so that, at normal ambient temperature, the Bragg wavelengths are sufficiently widely spaced that over the operating range of the sensor the wavelength shift of the reflected light will never be sufficient for the reflected light to have a wavelength overlap with the wavelength of the light reflected from another zone.

Each grating is, for example, 8 mm long. The gratings in a particular zone A,B or C are spaced apart by, for example, 10-20 mm. The spacing between the zones is greater than the spacing between adjacent gratings within one particular zone A, B or C.

The fibre used will be photosensitive to allow the creation of Bragg gratings along its length. Preferably, the photosensitive fibre optic cable 1 comprises either a germanium doped fibre, a boron-germanium co-doped fibre or an antimony-erbium-germanium co-doped fibre but is not limited to the use of such dopants to create the photosensitivity of the fibre.

Because the grating period of the fibre Bragg gratings 29 to 45 within each zone A to C are identical, the spacing between adjacent fibre Bragg gratings 29 to 45 contained within the same zone A, B or C can be much less than would be required if the gratings had different periods. This increases the sensitivity of the sensor within the zone A, B or C. For example, a spatial and/or temperature variation occurring in the vicinity of fibre Bragg grating 39 would create a wavelength shift in the Bragg wavelength of the reflected light from fibre Bragg grating 39. With the arrangement of FIG. 3, it is possible to associate the wavelength shift of the Bragg wavelength of the reflected light from fibre Bragg grating 39 with a spatial and/or a temperature variation occurring in the vicinity of zone B of the fibre optic cable 1.

With an array of short fibre Bragg gratings (29, 31 and 33 in zone A; 35, 37 and 39 in zone B; 41, 43 and 45 in zone C), the only reflection sensed by the detection system 53 emanates from the fibre Bragg grating positioned closest to the detection system 53 (assuming that the ambient temperature in the vicinity of all fibre Bragg gratings is substantially identical and no fibre Bragg grating is subjected to spatial variation). If any one of the fibre Bragg gratings subsequently experiences a spatial and/or temperature variation a secondary reflection, emanating from the particular fibre Bragg grating experiencing the said variation and at a different Bragg wavelength, will be sensed by the detection system 53. This secondary reflection will be strong and easily detectable by the detection system 53.

A fibre optic cable 1 arranged in the manner described by FIG. 3 may be deployed in apparatus where each zone A, B or C can be made to generally correspond to a particular element of the apparatus. For example, such a fibre optic cable 1 could be deployed along the leading edge of the wing of an aircraft to detect the potential icing of the aircraft wing and/or to monitor the operation of anti-icing heaters. In such a situation, each zone A, B or C could be made to generally correspond to a particular panel along the wing of the aircraft, thereby allowing a fault to be located to a particular panel. On detection of possible fault, the relevant panel could subsequently be removed to check for faults and to allow repair or replacement as necessary.

Figure 4:
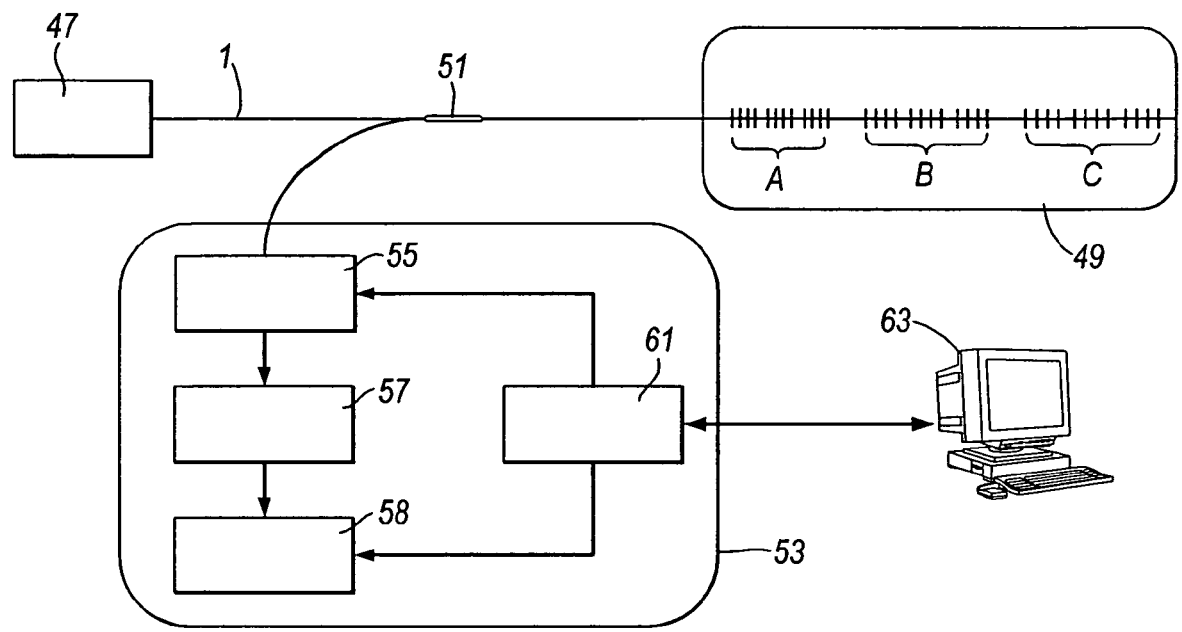
FIG. 4 shows a device for sensing spatial variations and/or temperature variations in the locality of a fibre optic cable using the fibre Bragg grating sensor according to the present invention.

FIG. 4 shows a device for sensing spatial variations and/or temperature variations in the locality of a fibre optic cable 1 using the fibre Bragg grating sensor as described in FIG. 3 and according to the present invention. In this device, a broadband continuous light source 47 is used to shine incident light onto the fibre Bragg gratings arranged within zones A, B and C as defined with reference to FIG. 3 and contained within the probe 49. Incident light from the broadband light source 47 is reflected by each of these fibre Bragg gratings, with the Bragg wavelength of reflected light being identical for all fibre Bragg gratings contained within one particular zone A, B or C due to the equality of the grating period of each fibre Bragg grating, this Bragg wavelength therefore being indicative of a particular zone A, B or C. The reflected light from each fibre Bragg grating is returned back down the fibre optic cable 1 and redirected via a 2×1 coupler 51 to a wavelength detection system 53. This wavelength detection system 53 comprises a Fabry-Perot tunable filter 55, a photodetector 57, an amplifier 59 and a digital signal processing card 61. The wavelength detection system 53 allows analysis of the reflected light patterns which enables detection of the occurrence of a spatial and/or a temperature variation, with the location of the variation along the fibre optic cable 1 also detectable in terms of the particular zone A, B or C of the probe 49 in which the said variation has been sensed. The personal computer 63 provides a user interface for the wavelength detection system 53, thereby allowing a user to monitor the situation remotely. The personal computer 63 also allows the user to control the scan such as by using a Fabry-Perot tunable filter 55, via the digital signal processing card 61. Other forms of monitoring the of the Bragg grating wavelength may be used.

Although a broadband light source is used in FIG. 5, it should be understood that other forms of electromagnetic radiation may be used.

Figure 5A:
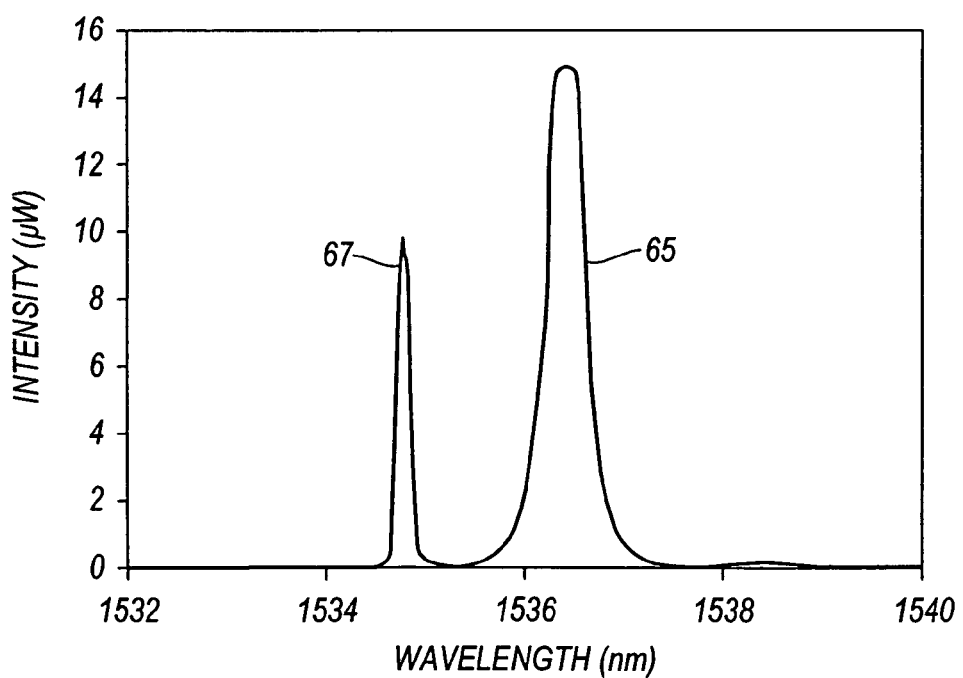
FIG. 5 shows three images from the user interface of the device described by FIG. 4.

FIG. 5 shows three images taken from the personal computer 63 of a device as shown in FIG. 4. The images are plots of reflected light intensity against wavelength. In FIG. 5(a), the peak 65 corresponds to the unique Bragg wavelength of light reflected by fibre Bragg gratings contained within one zone (for example, zone A). The peak 67 results from a reference fibre Bragg grating (not shown in FIG. 4) maintained at a known temperature within the control electronics of the wavelength detection system 53. There may be more than one reference fibre Bragg grating, with each reference fibre Bragg grating having a different grating period. In this case, the plot as shown in FIG. 5(a) would have a plurality of reference peaks, one reference peak resulting from each reference fibre Bragg grating and corresponding to the Bragg wavelength of the light reflected by that particular reference fibre Bragg grating.

Figure 5B:
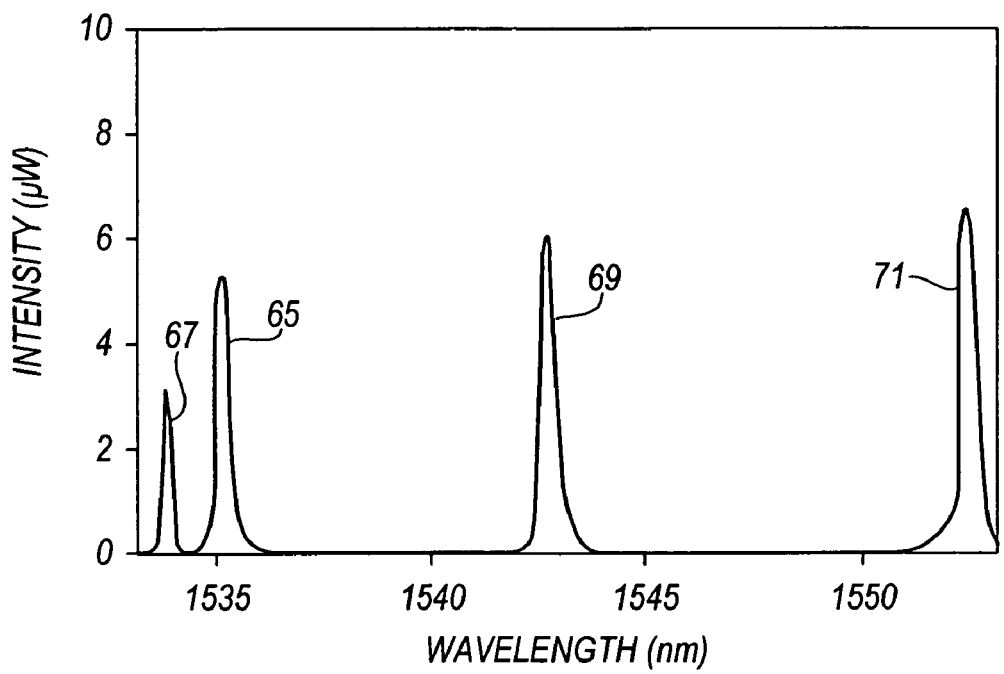

In FIG. 5(b), the three peaks 65, 69 and 71 correspond to the unique Bragg wavelengths of light reflected by fibre Bragg gratings contained within zones A, B and C. The fibre Bragg gratings contained within each zone possess a different grating period, leading to the reflection of light with a different Bragg wavelength from each which shows as three separate peaks 65, 69 and 71. The peak 67 corresponds to the reference fibre Bragg grating associated with zone A. There may be included further reference fibre Bragg gratings associated with zones B and C, but these are not shown in FIG. 5(b).

Because the reference fibre Bragg grating(s) are maintained at a constant known temperature and stress, the properties of the light reflected therefrom will be known. Therefore, any variations in the measured light reflected from a reference grating indicates that an error has occurred in the measuring device. For example, the measured light reflected from a reference grating can be used to correct drift in the wavelength-measuring Fabry-Perot grating 55 and its drive electronics.

Figure 5C:
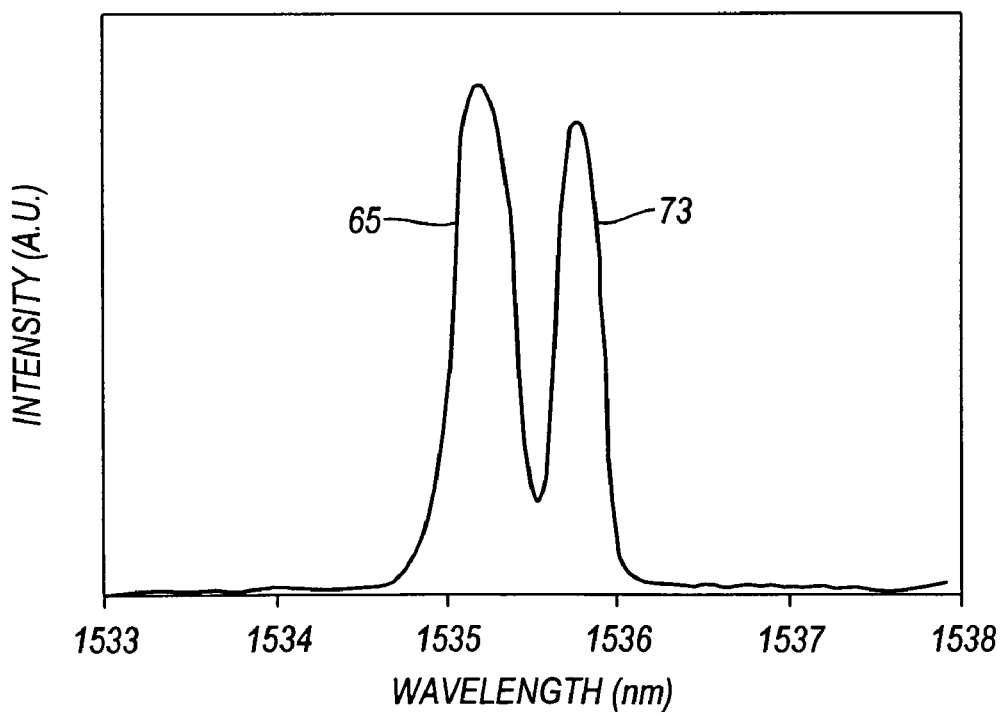

In FIG. 5(c), the peak corresponding to the Bragg wavelength of light reflected by fibre Bragg gratings contained within zone A is shown. The original peak 65 can be seen in this instance to have been split, the shifted wavelength resulting from a spatial and/or a temperature variation affecting one or more than one fibre Bragg grating in the vicinity of zone A and causing a second Bragg wavelength represented in FIG. 5(c) by the peak 73. It is therefore shown how a spatial and/or a temperature variation in the vicinity of one of the zones A, B or C is detected by the device described by FIG. 4, and how such a variation is represented at the user interface on the personal computer 63.

It will be appreciated that other configurations for arranging fibre Bragg gratings in zones, and other fibre optic cables, could of course be used to create a fibre Bragg grating sensor. The examples given herein are not intended to, and should not be taken to, limit the scope of the invention.

The invention claimed is:

1. A method of sensing variations in a structure, including:
providing a fibre optic cable comprising a plurality of zones wherein each zone contains a plurality of fibre Bragg gratings, each one of the fibre Bragg gratings having a respective grating period, the respective grating periods of the fibre Bragg gratings in any one zone being substantially identical to one another, fibre Bragg gratings in different zones having different respective grating periods, wherein each two adjacent fibre Bragg gratings of the same grating period in any one zone are spaced apart by a respective inter-grating spacing that is different from the grating period of the fibre Bragg gratings in that zone;
locating the fibre optic cable with respect to the structure such that the fibre optic cable is subject to variations selected from the group consisting of spatial variations, temperature variations, and variations that are both spatial and temperature related; providing a radiation receiver configured to receive radiation reflected by the Fibre Bragg gratings contained within each zone;
transmitting radiation in a direction along the fibre optic cable, the transmitted radiation being reflected back down the fibre optic cable by each one of the Fibre Bragg gratings to the radiation receiver; and
receiving the radiation reflected by each one of the Fibre Bragg gratings.

2. The method of claim 1, wherein adjacent ones of the Fibre Bragg gratings of substantially identical grating period are spaced apart by a smaller distance than adjacent ones of the Fibre Bragg gratings of different grating period.

3. The method of claim 1, wherein respective ones of the Fibre Bragg gratings in at least one of the said zones are different in terms of at least one of their length, inter-grating spacing and reflectivity.

4. The method of claim 1, further including providing the fibre optic cable with a reference Fibre Bragg grating and subjecting that reference Fibre Bragg grating to predetermined controlled conditions; monitoring radiation reflected by the reference Fibre Bragg grating.

5. The method of claim 4, wherein the reference Fibre Bragg grating is maintained at a predetermined temperature.

6. The method of claim 1, including monitoring the radiation reflected by the Fibre Bragg gratings.

7. The method of claim 6, including the steps of:
receiving the radiation reflected by the Fibre Bragg gratings contained within each zone and forming a signal indicative of the wavelength thereof; and
analysing the signal for indications that the fibre optic cable is subject to the variations.

8. The method of claim 7, wherein the analysing step includes comparing the signal with an expected signal that would be obtained when the Fibre Bragg gratings are not subject to the variations.

9. The method of claim 4, including comparing a signal indicative of the radiation reflected by the reference Fibre Bragg grating with a predetermined expected signal.

10. A device for sensing variations in a structure selected from the group consisting of spatial variations, temperature variations, and variations that are both spatial and temperature related, comprising:
a fibre optic cable comprising a plurality of zones wherein each zone contains a plurality of fibre Bragg gratings, each one of the fibre Bragg gratings having a respective grating period, the respective grating periods of the fibre Bragg gratings in any one zone being substantially identical to one another, fibre Bragg gratings in different zones having different respective grating periods, wherein each two adjacent fibre Bragg gratings of the same grating period in any one zone are spaced apart by a respective inter-grating spacing that is different from the grating period of the fibre Bragg gratings in that zone;
a transmitter configured to transmit radiation in a direction along the fibre optic cable; and
a receiver configured to receive the radiation reflected by the Fibre Bragg gratings contained within each zone; wherein radiation from the transmitter is reflected back down the fibre optic cable to the receiver by each one of the Fibre Bragg gratings.

11. The device of claim 10, adapted for locating the fibre optic cable with respect to the structure such that the fibre optic cable is subject to the variations in the structure.

12. The device of claim 10, wherein adjacent ones of the Fibre Bragg gratings of substantially identical grating period are spaced apart by a smaller distance than adjacent ones of the Fibre Bragg gratings of different grating period.

13. The device of claim 10, wherein respective ones of the Fibre Bragg gratings in at least one of the said zones are different in terms of at least one of their length, inter-grating spacing and reflectivity.

14. The device of claim 10, wherein the fibre optic cable includes one or more reference Fibre Bragg gratings arranged for being subjected to predetermined controlled conditions; and means for monitoring radiation reflected by the reference Fibre Bragg grating.

15. The device of claim 14, including means for maintaining the one or more reference Fibre Bragg gratings at a predetermined temperature.

16. The device of claim 10, including means for monitoring the radiation reflected by the Fibre Bragg gratings.

17. The device of claim 16, including:
  means for receiving the radiation reflected by the Fibre Bragg gratings contained within each zone and forming a signal indicative of the wavelength thereof; and
  means for analysing the signal for indications that the fibre optic cable is subject to the variations.

18. The device of claim 17, wherein the analysing means is operable to compare the signal with an expected signal that would be obtained when the Fibre Bragg gratings are not subject to the variations.

19. The device of claim 14, including means for comparing a signal indicative of the radiation reflected by the reference Fibre Bragg grating with a predetermined expected signal.

20. A fibre optic cable having a plurality of zones, wherein each zone contains a plurality of fibre Bragg gratings, each one of the fibre Bragg gratings having a respective grating period, the respective grating periods of the fibre Bragg gratings in any one zone being substantially identical to one another and fibre Bragg gratings in different zones having different respective grating periods, wherein each two adjacent fibre Bragg gratings of the same grating period in any one zone are spaced apart by a respective inter-grating spacing that is different from the grating period of the fibre Bragg gratings in that zone, and wherein each zone contains more than two fibre Bragg gratings.

21. The fibre optic cable of claim 20, wherein adjacent ones of the fibre Bragg gratings of substantially identical grating period are spaced apart by a smaller distance than adjacent ones of the fibre Bragg gratings of different grating period.

22. The fibre optic cable of claim 20, wherein respective ones of the fibre Bragg gratings in at least one of the said zones are different in terms of at least one of their length, inter-grating spacing and reflectivity.

23. A device for sensing variations in a structure selected from the group consisting of spatial variations, temperature variations, and variations that are both spatial and temperature related, the device comprising:
  a fibre optic cable having a plurality of zones, each zone containing a plurality of fibre Bragg gratings, each one of the fibre Bragg gratings having a respective grating period, the respective grating periods of the fibre Bragg gratings in any one zone being substantially identical to one another and fibre Bragg gratings in different zones having different respective grating periods, wherein each two adjacent fibre Bragg gratings of the same grating period in any one zone are spaced apart by a respective inter-grating spacing that is different from the grating period of the fibre Bragg gratings in that zone, and each zone contains more than two fibre Bragg gratings.

24. The device of claim 23, adapted for locating the fibre optic cable with respect to the structure such that the fibre optic cable is subject to the variations in the structure.

25. The device of claim 23, wherein adjacent ones of the fibre Bragg gratings of substantially identical grating period are spaced apart by a smaller distance than adjacent ones of the fibre Bragg gratings of different grating period.

26. The device of claim 23, wherein respective ones of the fibre Bragg gratings in at least one of the said zones are different in tenns of at least one of their length, inter-grating spacing and reflectivity.

27. The device of claim 23, wherein the fibre optic cable includes one or more reference fibre Bragg gratings arranged for being subjected to predetermined controlled conditions; and means for monitoring radiation reflected by the reference fibre Bragg grating.

28. The device of claim 27, further comprising means for maintaining the one or more reference fibre Bragg grating at a predetermined temperature.

29. The device of claim 23, further comprising means for monitoring the radiation reflected by the fibre Bragg gratings.

30. The device of claim 29, further comprising:
  means for receiving the radiation reflected by the fibre Bragg gratings contained within one or each zone and forming a signal indicative of the wavelength thereof; and
  means for analysing the signal for indications that the fibre optic cable is subject to variations selected from the spatial variations, temperature variations and variations that are both spatial and temperature related.

31. The device of claim 30, wherein the analysing means is operable to compare the signal with an expected signal that would be obtained when the fibre Bragg gratings are not subject to said variations.

32. The device of claim 30, wherein the fibre optic cable includes one or more reference fibre Bragg gratings arranged for being subjected to predetermined controlled conditions; and means for monitoring radiation reflected by the reference fibre Bragg grating, including means for comparing a signal indicative of the radiation reflected by the reference fibre Bragg grating with a predetermined expected signal.

33. A method of sensing variations in a structure selected from the group consisting of spatial variations, temperature variations and variations that are both spatial and temperature related, comprising:
  providing a fibre optic cable comprising a plurality of zones wherein each zone contains a plurality of fibre Bragg gratings, each one of the fibre Bragg gratings having a respective grating period, the respective grating periods of the fibre Bragg gratings in any one zone being substantially identical to one another and fibre Bragg gratings in different zones having different respective grating periods, wherein each two adjacent fibre Bragg gratings of the same grating period in any one zone are spaced apart by a respective inter-grating spacing that is different from the grating period of the fibre Bragg gratings in that zone; and
  locating the fibre optic cable with respect to the structure such that the fibre optic cable is subject to the variations in the structure, wherein each zone contains more than two fibre Bragg gratings.

34. The method of claim 33, wherein adjacent ones of the fibre Bragg gratings of substantially identical grating period are spaced apart by a smaller distance than adjacent ones of the fibre Bragg gratings of different grating period.

35. The method of claim 33, wherein respective ones of the fibre Bragg gratings in at least one of the said zones are different in terms of at least one of their length, inter-grating spacing and reflectivity.

36. The method of claim 33, further comprising providing the fibre optic cable with a reference fibre Bragg grating and subjecting that reference fibre Bragg grating to predetermined controlled conditions; monitoring radiation reflected by the reference fibre Bragg grating.

37. The method of claim 36, wherein the reference fibre Bragg grating is maintained at a predetermined temperature.

38. The method of claim 33, further comprising monitoring the radiation reflected by the fibre Bragg gratings.

39. The method of claim 38, further comprising:
receiving the radiation reflected by the fibre Bragg gratings contained within one or each zone and forming a signal indicative of the wavelength thereof; and
analysing the signal for indications that the fibre optic cable is subject to variations selected from the group consisting of spatial variations, temperature variations and variations that are both spatial and temperature related.

40. The method of claim 39, wherein the analysing step includes comparing the signal with an expected signal that would be obtained when the fibre Bragg gratings are not subject to said variations.

* * * * *